US012190690B2

(12) United States Patent
Bodas et al.

(10) Patent No.: US 12,190,690 B2
(45) Date of Patent: *Jan. 7, 2025

(54) PARKING GARAGE SECURITY SYSTEM (71) Applicant: Cloud Software LLC, Federal Way, WA (US)

(72) Inventors: Devadatta Bodas, Federal Way, WA (US); Kanchan Bodas, Federal Way, WA (US); Rajiv Nashikkar, Pune (IN); Tanmay Dharmadhikari, Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/129,237

(22) Filed: Mar. 31, 2023

(65) Prior Publication Data
US 2023/0237887 A1 Jul. 27, 2023

Related U.S. Application Data (63) Continuation of application No. 17/568,584, filed on Jan. 4, 2022, now Pat. No. 11,657,686, which is a continuation of application No. 17/093,116, filed on Nov. 9, 2020, now Pat. No. 11,250,676.

(51) Int. Cl.
*G08B 13/02* (2006.01)
*G06F 1/3231* (2019.01)
*G07C 9/32* (2020.01)
*H04L 9/40* (2022.01)
*H04L 41/0803* (2022.01)

(52) U.S. Cl.
CPC .......... *G08B 13/02* (2013.01); *G06F 1/3231* (2013.01); *G07C 9/32* (2020.01); *H04L 41/0803* (2013.01); *H04L 63/102* (2013.01)

(58) Field of Classification Search
CPC ..................................................... G08B 13/02
See application file for complete search history.

(56) References Cited

U.S. PATENT DOCUMENTS

| | | | | |
|---|---|---|---|---|
| 6,448,894 | B1 * | 9/2002 | Desai | G07C 9/00309 340/426.36 |
| 8,536,998 | B1 * | 9/2013 | Siu | H04L 67/12 340/870.01 |
| 9,652,912 | B2 | 5/2017 | Fadell et al. | |
| 10,650,650 | B2 | 5/2020 | Siminoff et al. | |
| 10,657,483 | B2 | 5/2020 | Lyman et al. | |
| 11,250,676 | B1 * | 2/2022 | Bodas | G08B 13/02 |
| 11,257,338 | B1 | 2/2022 | Bodas et al. | |

(Continued)

FOREIGN PATENT DOCUMENTS

CN 110991965 A 4/2020

*Primary Examiner* — Travis R Hunnings (57) ABSTRACT

A computer-implemented method includes receiving, by a base station of a first security system, an identification of a portable security system. The method further includes adding, by the base station, the portable security system as a sensor to a plurality of sensors monitored by the first security system. The method further includes configuring, by the base station, the portable security system in protect-mode, wherein the portable security system sounds an alarm in response to a sensor from the second system indicating a security-breach. The method further includes in response to the alarm from the portable security system, generating, by the base station, an alarm event of the first security system.

20 Claims, 6 Drawing Sheets (56) References Cited

U.S. PATENT DOCUMENTS

| | | | |
|---|---|---|---|
| 11,657,686 B2* | 5/2023 | Bodas | H04W 4/38 |
| | | | 340/541 |
| 2002/0111715 A1* | 8/2002 | Richard | B60R 16/0231 |
| | | | 701/1 |
| 2006/0163227 A1* | 7/2006 | Hillen | B23K 9/095 |
| | | | 219/130.21 |
| 2011/0012734 A1* | 1/2011 | Reese | G08B 13/2491 |
| | | | 340/541 |
| 2011/0150266 A1* | 6/2011 | Hohndel | G06F 21/31 |
| | | | 382/100 |
| 2012/0146788 A1* | 6/2012 | Wilson | G08B 13/187 |
| | | | 340/539.23 |
| 2016/0301779 A1* | 10/2016 | Cui | H04L 45/566 |
| 2017/0011605 A1 | 1/2017 | Grabham | |
| 2017/0079082 A1* | 3/2017 | Papay | H04W 4/70 |
| 2017/0286905 A1 | 10/2017 | Richardson et al. | |
| 2017/0293883 A1 | 10/2017 | Li et al. | |
| 2018/0005183 A1 | 1/2018 | Nguyen et al. | |
| 2018/0165637 A1 | 6/2018 | Romero et al. | |
| 2019/0354930 A1 | 11/2019 | Kosseifi et al. | |
| 2020/0034787 A1 | 1/2020 | Phillips et al. | |
| 2020/0082690 A1 | 3/2020 | Bunker et al. | |
| 2020/0134948 A1 | 4/2020 | Sengstaken, Jr. | |
| 2020/0198801 A1 | 6/2020 | Carthew et al. | |
| 2021/0204239 A1* | 7/2021 | Gruber | H04L 67/02 |

* cited by examiner

| Sensor Identifier | Sensor Type | ... | Account |
|---|---|---|---|
| 111111 | Door Sensor | | XXXX |
| 22222 | Camera | | XXXX |
| 33333 | Portable Security System | | YYYY |
| ... | ... | | |

PARKING GARAGE SECURITY SYSTEM

CROSS-REFERENCE TO RELATED APPLICATION

The present application is a continuation application of and claims priority from U.S. patent application Ser. No. 17/568,584 filed on Jan. 4, 2022, which is continuation of U.S. patent application Ser. No. 17/093,116 filed on Nov. 9, 2020, the contents of which are incorporated by reference herein in entirety.

BACKGROUND

The present invention generally relates to electronic circuits and computing technology that facilitates a security system for the protection of property.

Security systems provide protection from threats to security such as burglary, vandalism arson, etc. The security systems are used for the safety and protection of personnel, property and surroundings. Typically, security systems operate by monitoring one or more sensor devices that are placed at predetermined locations around the environment that is being protected by the security system. The sensor devices include motion detectors, light sensors, door sensors, noise sensors, humidity sensors, heat sensors, cameras, window sensors, glass-breakage sensors, etc.

SUMMARY

According to one or more embodiments, a computer-implemented method includes receiving, by a base station of a first security system, an identification of a portable security system. The method further includes adding, by the base station, the portable security system as a sensor to a plurality of sensors monitored by the first security system. The method further includes configuring, by the base station, the portable security system in protect-mode, wherein the portable security system sounds an alarm in response to a sensor from the second system indicating a security-breach. The method further includes in response to the alarm from the portable security system, generating, by the base station, an alarm event of the first security system.

According to one or more embodiments, a security system includes a plurality of sensors, and a base station that is configured to perform a method. The method includes receiving an identification of a portable security system. The method includes adding the portable security system as a sensor to a plurality of sensors monitored by the first security system. The method includes configuring, by the base station, the portable security system in protect-mode, wherein the portable security system sounds an alarm in response to a sensor from the second system indicating a security-breach. The method includes, in response to the alarm from the portable security system, generating, by the base station, an alarm event of the first security system.

According to one or more embodiments, a portable security system includes a sensor, and a processor configured to perform a method to secure an item by expanding a central security system. The method includes sending a request to a base station of the central security system to add the portable security system as a sensor of the central security system, the request comprising an identification code that identifies the portable security system. The method further includes receiving, in response, from the base station, a confirmation indicating that the portable security system has been added to a list of sensors of the central security system. The method further includes transitioning the portable security system in protect-mode, in response to receiving an instruction from the base station, wherein the portable security system generates an alarm in response to the sensor indicating a security-breach. The method further includes in response to the security-breach, sending, by the portable security system, a notification to the base station to generate an alarm event of the central security system.

Other objects and advantages of the present invention will become apparent to those of skill in the art upon contemplation of the disclosure herein in conjunction with the drawings as described below.

DETAILED DESCRIPTION

Embodiments of the present invention address technical challenges with security systems. Typically, a security system is static in nature. Security systems provide protection from threats to security such as burglary, vandalism arson, etc. The security system is used for the safety and protection of personnel, property and surroundings. The security system operates by monitoring one or more sensors that are placed at predetermined locations around a building that is being protected by the security system. The sensors can include, but not limited to, motion detectors, light sensors, door sensors, noise sensors, humidity sensors, heat sensors, cameras, window sensors, glass-breakage sensors, infrared sensors, etc. A base station of the security system monitors a security-breach indicated by any of the sensors. The base station and the sensors communicate with each other using wired and/or wireless communication protocols.

A technical challenge with the existing security systems is that they are static. That is, a security system can only offer protection to the building based on the existing sensors of the security system, which are placed in the one or more predetermined locations around the building. For example, the sensors can be placed at doors, windows, high-traffic areas, or other such locations based on human judgment. While such placement of the sensors may suffice for a residence, an office, a small business, a restaurant, or other such buildings that have designated or limited entry and/or exit points, the security system cannot be used in buildings such as parking garages, parks, driveways, yards, etc. where entry and exits are not limited. In such spaces, where a culprit, for example, a burglar, arsonist, etc. can access the space from any direction, and without designated doors and/or windows, placing the sensors can be a challenge. Accordingly, such spaces go unmonitored. Alternatively, in some examples, cameras are relied upon to monitor such spaces. However, such monitoring only facilitates analyzing a security-breach that has occurred in the past, and after the culprit has long fled. Prompt action for a possible intervention during or immediately after the security-breach in such spaces is a technical challenge with existing security systems. Here, "immediately" after the security-breach can include within a predetermined duration since the start of the security-breach, for example, 20 minutes, 40 minutes, or any other such predetermined duration in which first responders, such as police, firefighters, paramedics, can arrive at the scene of the security-breach.

Embodiments of the technical solutions described herein address such technical challenges. Further, embodiments described herein address problems such as an increase in break-ins or theft of property, such as vehicles, boats, shipment packages, and other such items that may typically be parked or placed outside the premises, where the premises are typically secured using a security system. For example, vehicles, boats, recreational vehicles, and other such items may be placed on a driveway. Further, shipment packages are placed in the yard for pickup, or upon receipt. While some of these items, such as vehicles, have their own security systems, these security systems are localized, and typically are limited to blaring of an alarm, flashing of lights, and other such localized signals.

Embodiments of the technical solutions described herein facilitate the security systems for such items to be dynamically connected to a security system of a building, where the item is in the vicinity of that building. The security system of the building is actively monitored, and facilitates to generate local as well as remote alarms in response to a breach of the security of the item.

Embodiments of the technical solutions described herein facilitate a security system to be expanded to monitor such spaces, where designated entry/exits are not available. Embodiments of the technical solution facilitate a first security system to be expanded by adding another security system as one of the sensors that are monitored by a base station of the first security system.

Figure 1:
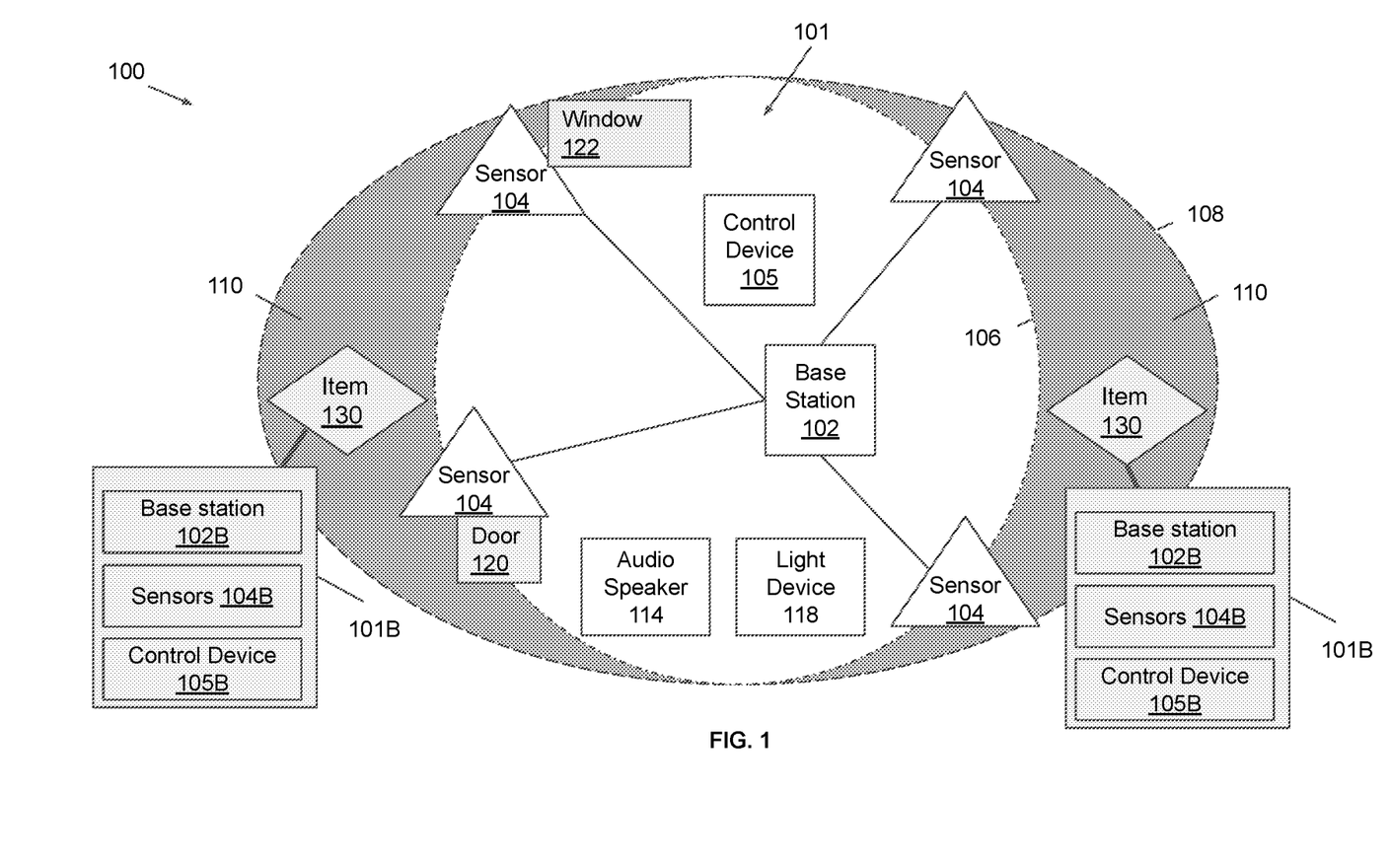
FIG. 1 depicts a block diagram of an expandable security system according to one or more embodiments.

FIG. 1 depicts a block diagram of an expandable security system according to one or more embodiments. The system 100 includes a security system 101, referred herein as a "central security system." The central security system 101 includes a base station 102 that monitors one or more sensors 104. The sensors 104 are placed at predetermined locations in an area 106. The area 106 can be part of a building 108 such as a residence, an office, a shop, a restaurant, a school, or any other building. The area 106 is protected by the security system 101. The sensors 104 can be placed at doors 120, windows 122, or other such locations, such as a hallway, stairs, etc. The base station 102 monitors the sensors 104 for a security-breach, in response to which the base station 102 generates an alarm event.

The alarm event can include a predetermined audible sound, for example, higher than a predetermined decibel value using audio speaker(s) 114. The alarm event can also include a visual notification, such as switching a light ON, flashing lights, strobing lights, or any other such visual indications using light emitting device(s) 118. The alarm event can further include sending wired or wireless communications to one or more devices to notify of the security breach. In response, recipients of the notification can try intervening the security breach, such as, by apprehending a culprit that causes the security breach, attending to a medical emergency, preventing fire from spreading, etc. For example, the recipients can include police, firefighters, paramedics, neighbors, relatives, friends, of a user of the security system 101, or the user him/herself. For such notifications, the base station 102 sends notification communications to be received by communication devices in associated with such personnel. FIG. 1 depicts a control device 105 that can be such a communication device associated with a user of the security system 101.

The control device 105 can be a control panel associated with the security system 101. Alternatively the control device 105 can be a communication device such as, a phone, a tablet computer, a laptop computer, a server computer, a desktop computer, or any other such communication device that can receive the notification communicated by the base station 102.

The building 108 can further include an area 110 that is not monitored by the security system 101. The area 110 is not covered by the security system 101 because of a lack of sensors 104 in the area 110. The area 110 can be a yard, a driveway, parking areas or a parking garage, a porch, boat moorage, bicycle stand, a shed, a gazebo, a sunroom, or any other such structure that is not part of the area 106 that is covered by the security system 101. It is understood that the depiction of the area 110, the building 108, and the area 106 in FIG. 1 is exemplary, and that in other embodiments, the orientation of the building 108, and the areas 106, 110 can vary from the depiction. In an example, the area 110 can be another structure that is attached to/with the building 108. Embodiments described herein facilitate expanding the perimeter of the security system 101 dynamically.

Accordingly, as described earlier, an item 130 that is in the area 110 is typically not protected by the security system 101. The item 130 can be a shipment package, a furniture item, a bike, a toy, a vehicle or any other such item. It should be understood that although only a single item 130 is shown, in one or more embodiments the area 110 can include multiple items 130. For example, the area 110 can encompass one or more vehicles, bikes, furniture items, etc.

In an example, the building 108 can be a parking garage, with the security system 101 being a central security system that secures the area 106, such as where an office of the parking garage exists in the building 108, or any other such area. The sensors 104 can include cameras, radio frequency identification (RFID) scanners, garage-entry ticket machines, or any other garage entry device that provides access to a parking garage. The vast portion of the parking garage, where one or more patrons park their vehicles may not be protected by the security system 101. Hence, typically, patrons are warned that their vehicles and belonging in such vehicles are not being secured.

In an example, the item 130 has a security system 101B of its own. The security system 101B includes a base station 102B, a control device 105B, and a set of sensors 104B of its own. For example, in the above example with the item 130 being a vehicle, the security system 101B can be a security system of the vehicle. The security system 101B can include its own audio devices 114 and light emitting devices 118 in one or more embodiments. The operation of the security system 101B is similar to that of the security system 101, and hence, not repeated herein.

The security system 101 and the security system 101B can operate in several modes. The modes can include a protect-mode, a sleep-mode, among other modes. By default, in one or more embodiments of the present invention, the security system 101/101B is in the sleep-mode. The security system 101/101B can be put in one of the modes by sending a signal to the base station 102/102B to change the operational mode. Alternatively, or in addition, such a signal can be input via the control device 105/105B.

In the protect-mode the security system 101/101B provides anti-theft protection to the area 106 and/or the item 130 that is assigned to the security system 101/101B. In the protect-mode, the security system 101/101B, using the sensors 104/104B, detects a movement, break-in, or any other unauthorized action with the area/item assigned to the security system 101/101B. In response, the security system 101/101B causes an alarm to sound. For example, the audio speaker 114 can be used to generate an audible alarm. In addition, or alternatively, the base station 102/102B can send a notification to a server, such as a notification center (not shown), as part of the alarm. In addition, or alternatively, the base station 102/102B can send a notification to a user associated with the security system 101/101B. The base station 102/102B can be programmed where to send the message notification.

The security system 101/101B can further provide an audio/visual notification that can deter a theft of the item 130 and any other property in the protected area 106. For example, the audio speaker 114 and/or the light emitting device 118 can provide the audiovisual notification. The audiovisual notification can include an alarm sound, a flashing light pattern, or any other combination.

In the sleep-mode the security system 101/101B does not monitor a security-breach using the sensors 104/104B. In one or more embodiments, the sensors 104/104B are put in a power saving mode. Accordingly, in sleep-mode, an alarm event cannot be raised by the security system 101/101B.

Figure 2:
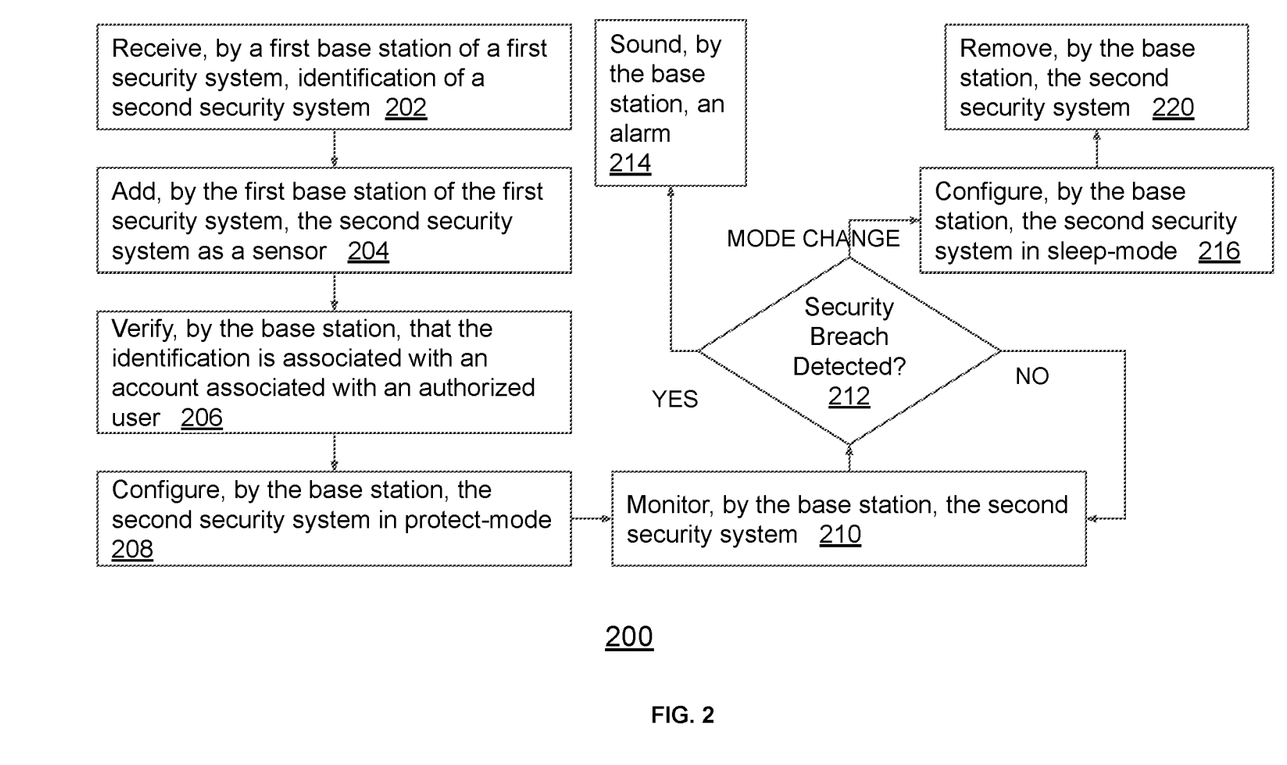
FIG. 2 depicts a flowchart of a method for expanding the security system according to one or more embodiments.

FIG. 2 depicts a flowchart of a method for expanding the security system according to one or more embodiments. The method 200 that is depicted is described in context of FIG. 1, with reference to the security system 101 as a central security system, and the security system 101B as a portable security system. As described herein, the central security system can be a security system of a building (e.g., public garage, home, private garage, etc.), and the portable security system can be a security system of a vehicle that is being parked in the building. It is understood that other example scenarios can also exist, such as, the central security system being that of a building (e.g., home, office, etc.), and the portable security system being that of a vehicle, shipment package, furniture, or any other item 130 that is in the vicinity of the building. The method 200 facilitates expanding the central security system using the portable security system.

The method 200 includes, at block 202, receiving, by the base station 102 of the central security system 101, identification of the portable security system 101B. It is understood that the method 200 is described with respect to only one portable security system 101B, however, the method is applicable to multiple portable security systems 101B to be configured to be added to the security system 101. In other words, the security system 101 can be expanded using one or more portable security systems 101B simultaneously. Further, the any one or more of the portable security systems 101B that have been added to the security system 101 can be dynamically added and/or removed, making the coverage of the security system 101 dynamic, i.e., vary at runtime.

The identification of the portable security system 101B is received by scanning an identifier associated with the portable security system 101B via a sensor 104 of the central security system 101. For example, the portable security system 101B can be associated with an identification device, which is scanned by the sensor 104 of the central security system 101. The identification device can be a radio frequency identification (RFID) device, a mobile, or any other such device that is associated with the portable security system 101B. The identification device can also be a card with a barcode, a QR-code, an image, or any other such machine-readable identification code. Alternatively, the identification of the portable security system 101B can be received via a near-field communication, such as using BLUETOOTH®, ZIGBEE®, or any other such communication protocols. The machine-readable code is a unique code associated with the portable security system 101B. The sensor 104 of the central security system 101 can be an RFID scanner, a camera, a code reader, a near-field communicator, or any other such device. In one or more embodiments, the sensor 104 can facilitate a manual entry of the identification of the portable security system 101B. For example, the device can include a keypad (not shown) that facilitates manual entry of the identification information. Alternatively, or in addition, the identification of the portable security system 101B can be received by the base station 102 via internet-of-things (IoT), or any other communication technique that uses the Internet.

At block 204, the base station 102 of the central security system 101 adds the portable security system 101B as a sensor 104. The portable security system 101B can be added to the set of sensors 104 that is monitored by the base station 102. The base station 102 includes a list 250 (FIG. 3) of sensors 104 that it monitors. The list 250 can be maintained as a data structure, such as an array, a database table, or any other electronic data structure. The list 250 can be stored in a memory and/or storage disk of the base station 102. The portable security system 101B is added to the list 250. In an example, each entry of the list 250 of sensors in the base station 102 includes at least an identifier and type of the sensor 104 that is being monitored by the base station 102. The list 250 can include additional information, such as location, time at which the sensor was added to the list 250, etc., in some embodiments. In an embodiment, the base station 102 sends a confirmation to the portable security system 101B that it has been added as one of the sensors 104. The confirmation can include a code that the base station 102 assigns the portable security system in one or more embodiments.

In one or more embodiments, at block 206, the base station 102, upon receiving the identification, verifies that the identification is associated with an account associated with an authorized user. An "authorized user" here is an entity that has authorized any payment that may be required by the base station 102 to monitor the portable security system 101B. The authorized user can maintain an account for such payments. The account and/or the authorized user are associated with the identifier of the portable security system 101B. In an example, the base station 102 verifies that the portable security system 101B is associated with the authorized user (or account) by cross-referencing with another database table, or any other data structure. If the identifier does not refer to an authorized user/account, the base station 102 can decline adding the portable security system 101B to the list 250. In one or more embodiments, a user of the portable security system 101B can receive a notification, for example via the sensor being used to scan the identification information, that the addition was declined. The user of the portable security system 101B can add the authorized user/account information via a separate interface (not shown) and subsequently scan the identification information again.

Figure 3:
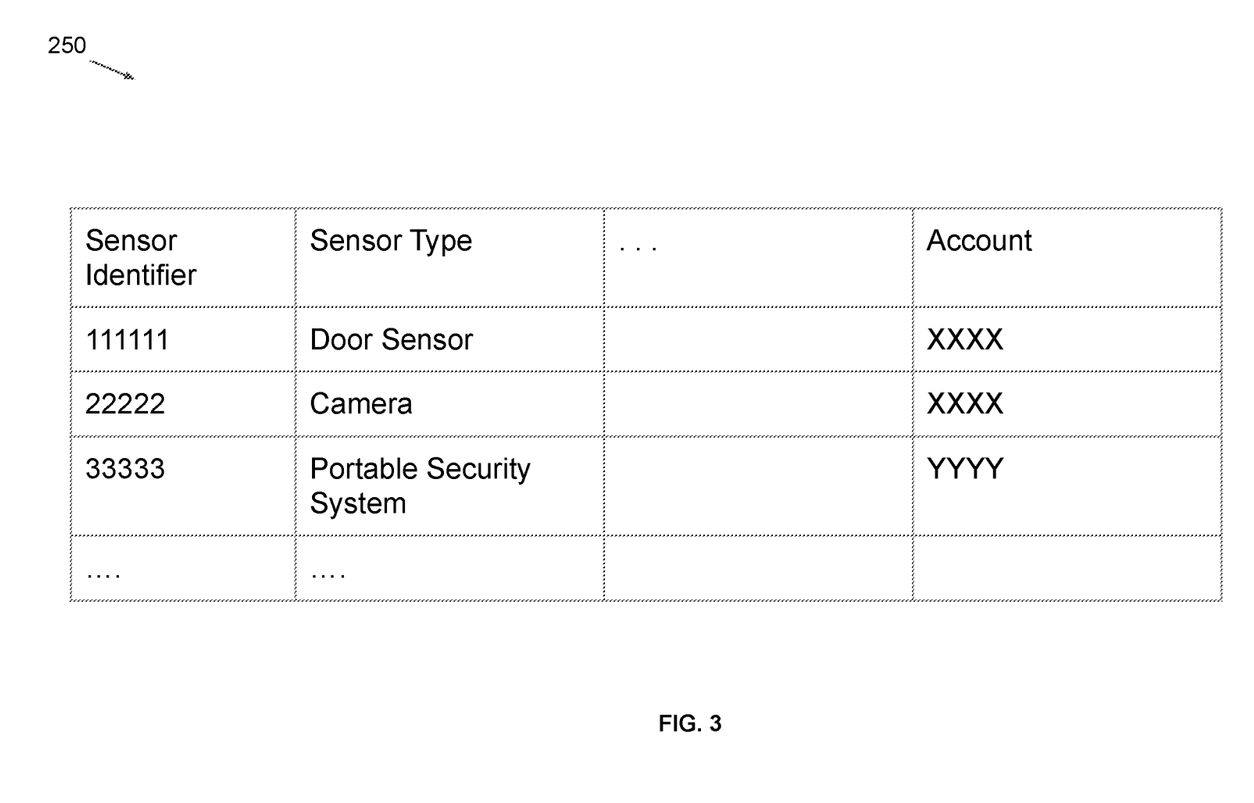
FIG. 3 depicts a list of sensors monitored by a security system according to one or more embodiments.

In an example, adding the portable security system 101B to the list 250 of the base station 102 includes initiating a communication link with the portable security system 101B. The communication can occur via one of the communication protocols such as BLUETOOTH®, ZIGBEE®, or using known techniques for internet-of-things (IoT) etc. In one or more embodiments, the entry in the list 250 corresponding to the portable security system 101B includes a communication address associated with the portable security system 101B. For example, the communication address can include an internet protocol (IP) address, a port number, or any other type of communication address for the base station 102 to communicate with the portable security system 101B. In one or more examples, the communication address of the portable security system 101B is associated with the base station 102B of the portable security system 101B. The type of communication address depends on the communication protocol that is used to communicate with the portable security system 101B. In one or more embodiments, the base station 102 communicates with a first portable security system 101B via a first communication protocol, such as ZIGBEE®, and with a second portable security system 101B via a second communication protocol, such as ZWAVE®. The communications between the base stations 102 and 102B can be encrypted or secured in any other manner.

At block 208, the base station 102 configures the portable security system 101B in protect-mode. The base station 102 can send a signal to the portable security system 101B to make this transition. In one or more embodiments, the transition to the protect-mode occurs after a predetermined duration since the scanning of the identification of the portable security system 101B. In yet other embodiments, the base station 102 sends the signal to transition the portable security system 101B to protect-mode in response to receiving a notification from the user of the portable security system 101B.

For example, consider the case where the portable security system 101B is associated with a vehicle and the central security system 101 is a security system for the entire garage in which the vehicle is going to be parked. The user (e.g., driver of the vehicle) scans an identification of the portable security system 101B, for example, by scanning a parking pass, a parking entry card, a license tag of the vehicle, an RFID chip, a mobile phone, or any other form of identification that is associated with the vehicle, which in turn is associated with the portable security system 101B. In an example, the user enters the identification manually. The central security system 101 registers the portable security system 101B as a sensor 104. Further, after the user parks the vehicle, s/he can notify the central security system 101 to switch the vehicle into the protect-mode. For example, the user can send the notification using a mobile phone, a device placed in the parking spot, the portable security system 101B, or using other such technique. Alternatively, or in addition, the central security system 101 transitions the portable security system 101B to the protect-mode after a predetermined duration after the scanning of the identification by the user.

During the configuring of the portable security system 101B into protect-mode, the portable security system 101B provides a predetermined wait-period to complete the transition. For example, upon receiving an instruction from the central security system 101 to transition into the protect-mode, the portable security system 101B initiates a timer of a predetermined wait-period, for example, 30 seconds, 1 minute, etc., or any other configurable duration. In one or more embodiments, the portable security system 101B provides an audio/visual indication, for example, an audible beep, a flashing light, etc., that the protect-mode is being initiated. During this wait-period, the user can cancel the transition. For example, the user can send a cancellation to the central security system 101 via a mobile device, a device in the parking garage, the portable security system 101B, or any other techniques. The user can instruct the central security system 101 to transition into the protect-mode when s/he is ready. Such an instruction can be sent a mobile device, a device in the parking garage, the portable security system 101B, or any other techniques.

Alternatively, consider the case where the portable security system 101B is associated with a shipment package and the central security system 101 is a security system for a house, an office, a building, etc., where the shipment package is to be delivered and/or stored. The user (e.g., shipment delivery person) scans an identification of the portable security system 101B, for example, by scanning his/her identification, shipment package identification, an RFID tag/chip, a mobile phone, or any other form of identification(s) associated with the shipment package, which is associated with the portable security system 101B. Several other such examples where the embodiments herein can be used can be realized by a person skilled in the art, and each and every such example is not listed herein.

It should be noted that only the portable security system 101B that is identified and/or requested is transitioned to protect-mode, and the operational mode of other sensors 104 of the security system 101 is not changed. Consider the case that the security system 101 is monitoring multiple portable security systems 101B, for example, a first portable security system of a first vehicle, and a second portable security system of a second vehicle. A first authorized user associated with the first vehicle can transition the operational mode of the first security system from protect-mode to sleep-mode, and vice versa, and such transition does not affect the operational mode of the second security system. For example, the second security system can be in sleep-mode (or protect-mode) during such transitions with the first security system. Accordingly, the security system 101 can be dynamically expanded.

Further, the transition of the operational mode of the first security system does not affect the operational mode of other sensors 104 of the security system 101. For example, if the security system 101 includes a door sensor, a window sensor, a motion sensor, etc., the operational mode of these sensors are not affected by the transition of the operational mode of the portable security system 101B.

Once the portable security system 101B is transitioned into the protect-mode, the central security system 101 monitors the portable security system 101B for any security breach, at block 210. The security breach can include the portable security system 101B being displaced by more than a predetermined threshold, for example, over 5 meters, 10 meters, or any other such configurable threshold. The security breach can further include a break-in, glass-break, water-leak, an impact, or any other such events that are detected using one or more sensors 104B of the portable security system 101B. The base station 102 of the central security system 101 monitors the portable security system 101B by monitoring if any of the sensors 104B has detected any such security breach. In one or more embodiments, the sensors 104B send an indication of the security breach to the base station 102B of the portable security system 101B, which in turn sends the notification of the security breach to the base station 102 of the central security system 101. The monitoring is performed continuously.

At block 212, if a security breach is not detected, the monitoring (210) continues as described herein, at least until a breach is detected or until the operating mode of the portable security system 101B is changed. Alternatively, if a security breach is detected (212), the base station 102 sounds an alarm, at block 214. The alarm can include generating an alarm event as described herein.

Accordingly, the central security system 101 can be expanded to monitor the security of the item 130, for example, the vehicle, using the portable security system 101B that is associated with the item 130. The alarm event that the central security system 101 generates is an improvement over the alarm event that the portable security system 101B typically generates. For example, the alarm event that the portable security system 101B generates is local, such as, an audible alarm, whereas the central security system 101 can generate a multifaceted alarm event as described herein, that can even result in security personnel intervening the security breach.

Further, at block 216, the central security system 101 changes the portable security system 101B into the sleep-mode upon receiving an instruction to do so. The instruction can be received via the control device 105 or the sensors 104 of the central security system 101. Alternatively, the instruction can be received via a device in the parking garage (e.g., a parking meter), or any other such device. Alternatively, the instruction can be provided via the base station 102B, the sensors 104B, or any other device of the portable security system 101B. In one or more embodiments, the central security system 101 validates that the instruction is received from an authorized user/device associated with the portable security system 101B. Accordingly, the central security system 101 ensures that only an authorized user is able to change the operational mode of the item 130.

Further, at block 220, the base station 102 removes the portable security system 101B from the list 250 of sensors 104 of the central security system 101. In an embodiment, the base station 102 removes the portable security system 101B from the list 250 in response to an instruction to remove the portable security system 101B, which is separate from the instruction to transition the portable security system 101B into the sleep-mode. In another embodiment, the instruction to remove the portable security system 101B can be combined with the instruction to transition the portable security system 101B into the sleep-mode. Once, the portable security system 101B is removed from the list 250, the base station 102 of the central security system 101 does not monitor the portable security system 101B for security breaches. The base station 102 does not monitor the portable security system 101B also in the sleep-mode; however, in the portable security system 101B can be transitioned back to the protect-mode from the sleep-mode causing the base station 102 to restart the monitoring. In an embodiment, the base station 102 sends a confirmation to the portable security system 101B that it has been removed as one of the sensors 104.

Figure 4:
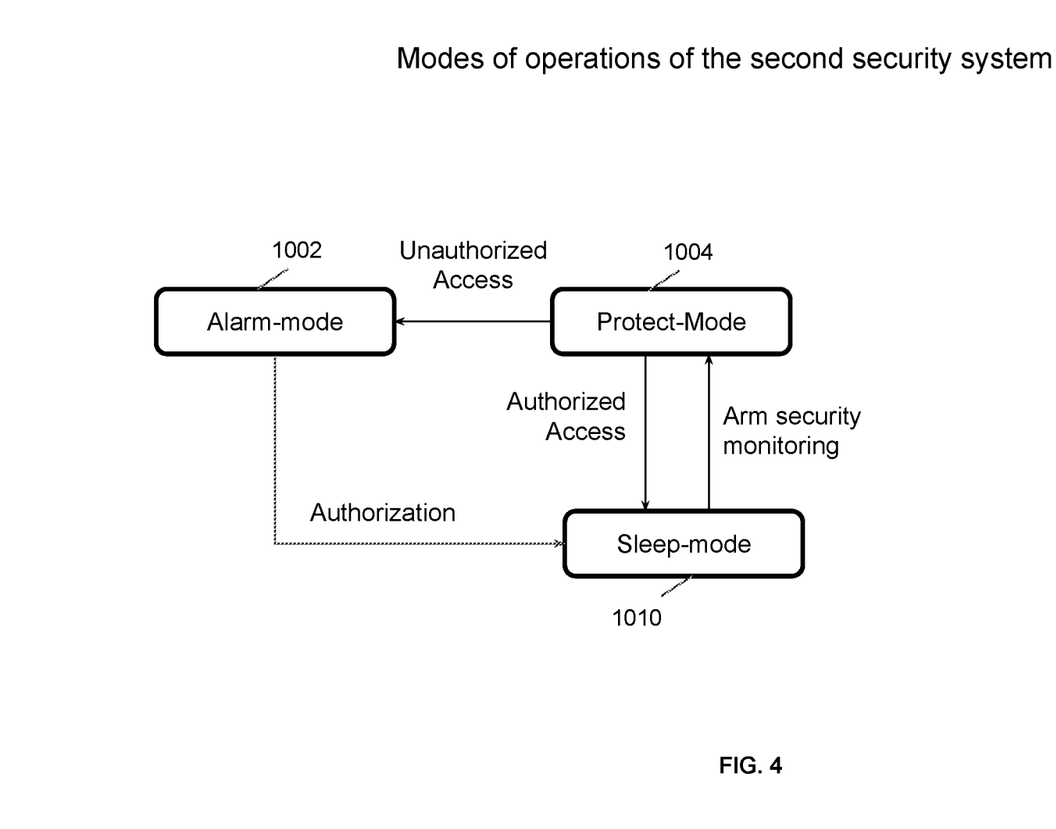
FIG. 4 depicts a state transition diagram for the various states in which a portable security system can be programmed according to one or more embodiments.

FIG. 4 depicts a state transition diagram for the various states in which the portable security system 101B can be programmed according to one or more embodiments. The portable security system 101B can be placed in the protect-mode (1004) at the initial identification and addition of the portable security system 101B to the central security system 101. The authorized user can transition the portable security system 101B, from the protect-mode, into the sleep-mode (1010) once monitoring is to be stopped. Alternatively, if the item 130 is accessed in an unauthorized manner, i.e., displaced beyond a threshold, without providing authorization, the portable security system 101B, and in turn, the central security system 101, enters into the alarm-mode (1002). The alarm is sounded in the alarm-mode (1002), including a local audiovisual notification, remote audiovisual notification, requesting security personnel (e.g., police) to intervene, etc.

The shipment device 130 can be transitioned from the alarm-mode (1002) to the sleep-mode (1010) by providing authorization, for example, security code, scanning identification, or in any other manner.

Figure 5:
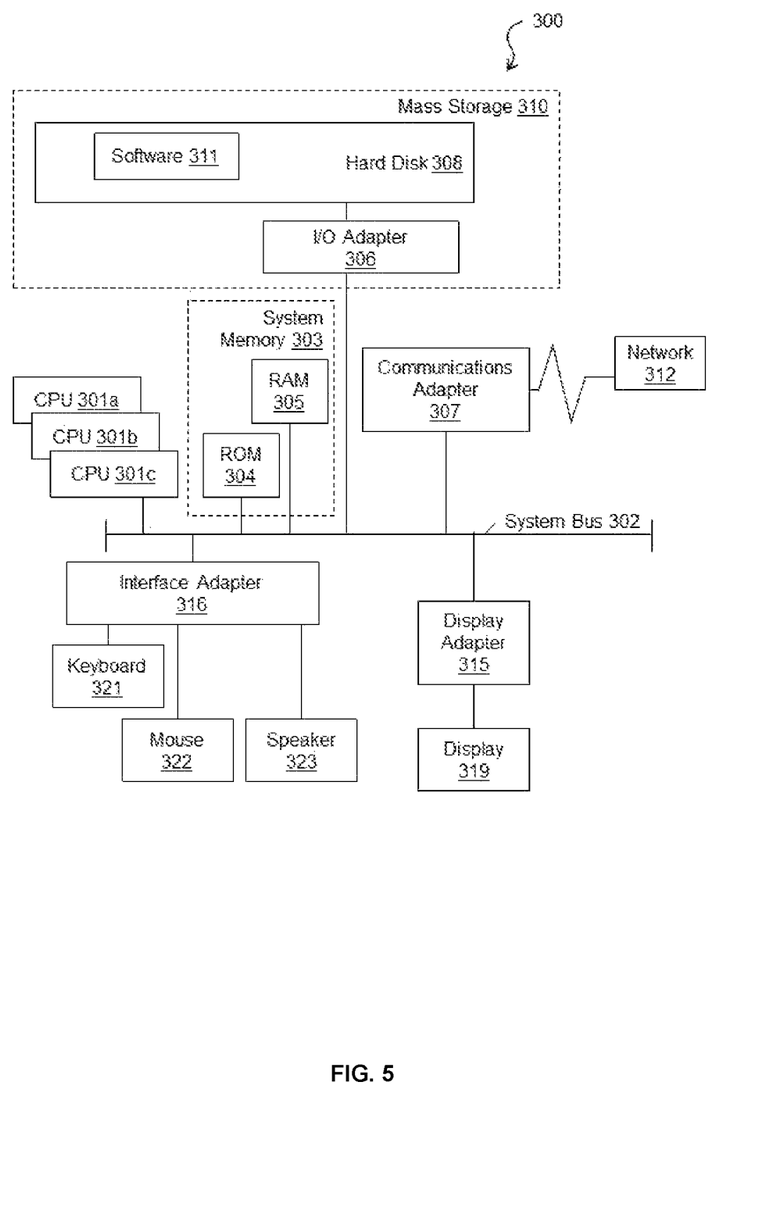
FIG. 5 depicts a computer system according to one or more embodiments.

Turning now to FIG. 5, a computer system 300 is generally shown in accordance with an embodiment. The computer system 300 can be used as a base station, sensor, or the security system(s) as described herein. The computer system 300 can be an electronic, computer framework comprising and/or employing any number and combination of computing devices and networks utilizing various communication technologies, as described herein. The computer system 300 can be easily scalable, extensible, and modular, with the ability to change to different services or reconfigure some features independently of others. The computer system 300 may be, for example, a server, desktop computer, laptop computer, tablet computer, or smartphone. In some examples, computer system 300 may be a cloud computing node. Computer system 300 may be described in the general context of computer system executable instructions, such as program modules, being executed by a computer system. Generally, program modules may include routines, programs, objects, components, logic, data structures, and so on that perform particular tasks or implement particular abstract data types. Computer system 300 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 300 has one or more central processing units (CPU(s)) 301a, 301b, 301c, etc. (collectively or generically referred to as processor(s) 301). The processors 301 can be a single-core processor, multi-core processor, computing cluster, or any number of other configurations. The processors 301, also referred to as processing circuits, are coupled via a system bus 302 to a system memory 303 and various other components. The system memory 303 can include a read only memory (ROM) 304 and a random access memory (RAM) 305. The ROM 304 is coupled to the system bus 302 and may include a basic input/output system (BIOS), which controls certain basic functions of the computer system 300. The RAM is read-write memory coupled to the system bus 302 for use by the processors 301. The system memory 303 provides temporary memory space for operations of said instructions during operation. The system memory 303 can include random access memory (RAM), read only memory, flash memory, or any other suitable memory systems.

The computer system 300 comprises an input/output (I/O) adapter 306 and a communications adapter 307 coupled to the system bus 302. The I/O adapter 306 may be a small computer system interface (SCSI) adapter that communicates with a hard disk 308 and/or any other similar component. The I/O adapter 306 and the hard disk 308 are collectively referred to herein as a mass storage 310.

Software 311 for execution on the computer system 300 may be stored in the mass storage 310. The mass storage 310 is an example of a tangible storage medium readable by the processors 301, where the software 311 is stored as instructions for execution by the processors 301 to cause the computer system 300 to operate, such as is described herein below with respect to the various Figures. Examples of computer program products and the execution of such instruction is discussed herein in more detail. The communications adapter 307 interconnects the system bus 302 with a network 312, which may be an outside network, enabling the computer system 300 to communicate with other such systems. In one embodiment, a portion of the system memory 303 and the mass storage 310 collectively store an operating system, which may be any appropriate operating system, such as the z/OS or AIX operating system, to coordinate the functions of the various components shown in FIG. 5.

Additional input/output devices are shown as connected to the system bus 302 via a display adapter 315 and an interface adapter 316 and. In one embodiment, the adapters 306, 307, 315, and 316 may be connected to one or more I/O buses that are connected to the system bus 302 via an intermediate bus bridge (not shown). A display 319 (e.g., a screen or a display monitor) is connected to the system bus 302 by a display adapter 315, which may include a graphics controller to improve the performance of graphics intensive applications and a video controller. A keyboard 321, a mouse 322, a speaker 323, etc. can be interconnected to the system bus 302 via the interface adapter 316, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 300 includes processing capability in the form of the processors 301, and, storage capability including the system memory 303 and the mass storage 310, input means such as the keyboard 321 and the mouse 322, and output capability including the speaker 323 and the display 319.

In some embodiments, the communications adapter 307 can transmit data using any suitable interface or protocol, such as the internet small computer system interface, among others. The network 312 may be a cellular network, a radio network, a wide area network (WAN), a local area network (LAN), or the Internet, among others. An external computing device may connect to the computer system 300 through the network 312. In some examples, an external computing device may be an external web server or a cloud computing node.

It is to be understood that the block diagram of FIG. 5 is not intended to indicate that the computer system 300 is to include all of the components shown in FIG. 5. Rather, the computer system 300 can include any appropriate fewer or additional components not illustrated in FIG. 5 (e.g., additional memory components, embedded controllers, modules, additional network interfaces, etc.). Further, the embodiments described herein with respect to computer system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 6:
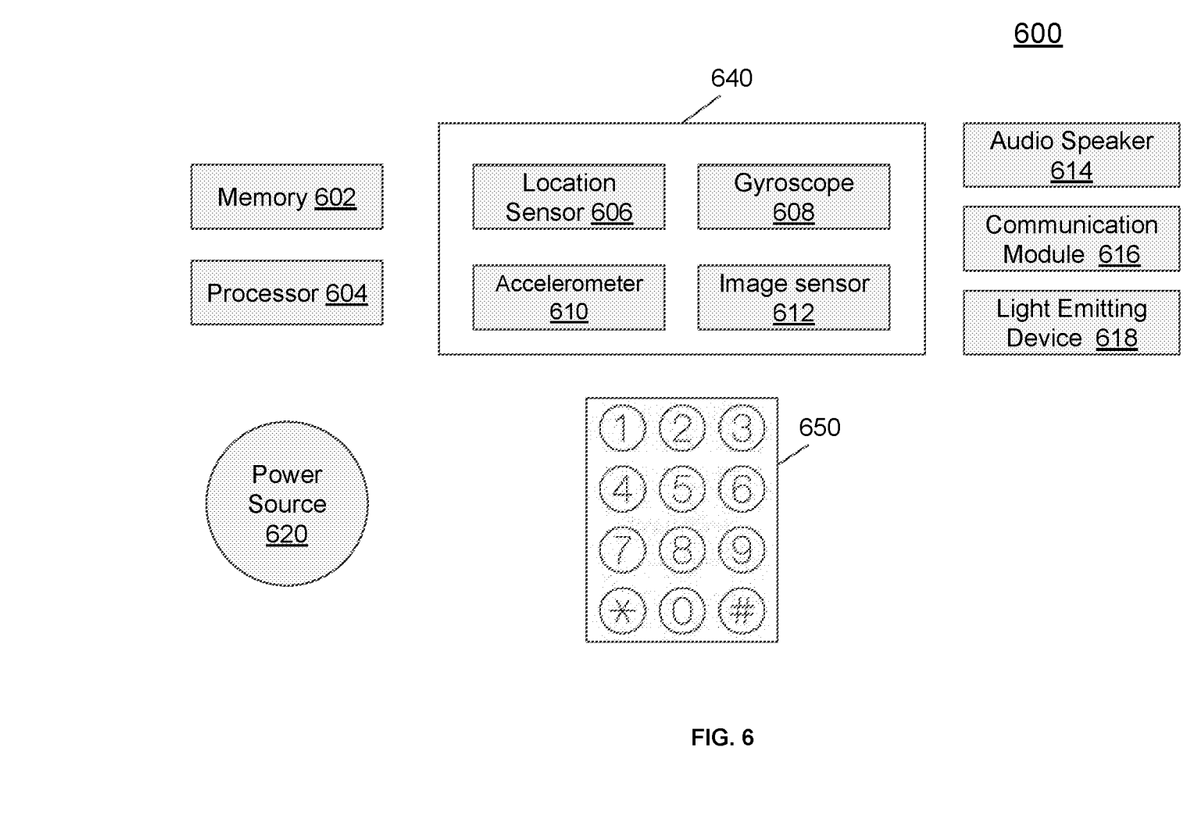
FIG. 6 depicts a block diagram of a portable security device 600 according to one or more embodiments.

FIG. 6 depicts a block diagram of a portable security device 600 according to one or more embodiments. The portable security device 600 can be used as the portable security system 101B. For example, the portable security device 600 can be placed inside, on, or in any other association with a vehicle, a boat, a shipment package, or any other item 130 that is to be protected. The portable security device 600 can communicate with the base station 102 of the central security system 101 to provide security protection to the item 130, and further to expand the coverage of the central security system 101.

The portable security device 600 includes a memory device 602, and a processor 604. The portable security device 600 also includes a power source 620 that provides electric power to the processor 604, the memory device 602, and other components of the portable security device 600. The power source 620 can be charged using an electric connection (not shown), solar power, or any other source of power. The processor 604 can include several processing units, such as one or more processing cores, a graphics processing unit, a digital signal processing unit, an arithmetic logic unit, and other such types of processing units. The processor 604 is coupled with the memory device 602 to facilitate execution of one or more computer executable instructions. In one or more embodiments, the memory device 602 includes computer executable instructions.

The memory device 602 can include volatile memory and non-volatile memory. In one or more embodiments of the invention, data stored on the non-volatile memory may be encrypted.

In addition, the portable security device 600 includes a set of sensors 640. The set of sensors can include a location sensor 606, a gyroscope 608, an accelerometer 610, an image sensor 612 (camera) and other sensors. The portable security device 600 also includes an audio emitting device 614, such as an audio speaker. The portable security device 600 further includes a light emitting device 618, such as a light emitting diode (LED) lamp, or any other type of visual indicator. The light emitting device 618 can be caused to light up, start flashing, or perform any other pattern to indicate a visual warning. In an embodiment, the visual warning may be for a camera or another sensor of the central security system 101. In one or more embodiments, the light emitting device 618 emits light using a frequency that is not visible to human eye, for example, using an infrared frequency. Alternatively, or in addition, the light emitting device 618 emits a notification that can be seen by human eye. The portable security device 600 also includes a keypad 650. The keypad 650 can include one or more buttons or other user interface elements.

The portable security device 600 includes a communication module 616 that facilitates one or more modes of communication to/from the processor 604 with one or more external devices. For example, the communication module 616 can facilitate a wired communication. In addition, the communication module 616 can facilitate wireless communication. For example, the communication module 616 can communicate signals for reception by the base station 102 of the central security system 101 using the Internet using Wi-Fi, LTE, 3G, or any other type of communication networks. The communication module 616 can also include hardware and corresponding software that facilitate near field communication, using communication protocols such as BLUETOOTH, Z-WAVE, or any other such communication protocols. The communication module 616 facilitates communication to/from the portable security device 600.

The communication module 616 facilitates external devices, such as the base station 102 to send signals and data to the portable security device 600. For example, the base station 102 can configure the portable security device 600. Such configuring can include changing an operational mode of the portable security device 600. Configuring the portable security device 600 includes transferring data that can include one or more computer executable instructions to the portable security device 600. In addition, the data can include images, codes, parameter values (text, numbers, or other characters), and other such data that is used during execution of one or more computer executable instructions by the processor 604.

The portable security device 600 can operate in the protect-mode and the sleep-mode among other modes. The portable security device 600 can be put in one of the modes by sending a signal to change the operational mode. Such a signal can be sent via the communication module 616. Alternatively, or in addition, such a signal can be input via the keypad 650.

In the protect-mode the portable security device 600 secures the item 130 that is assigned to the portable security device 600 by monitoring the sensors 640. In the sleep-mode the sensors 640 are not monitored.

In the protect-mode, the processor 604, using the sensors 640, detects a security breach of the item 130. For example, if the movement of the item 130 is beyond a predetermined threshold, the processor 604 raises an alarm. For example, the audio speaker 614 can be used to generate an audible alarm. In addition, or alternatively, the processor 604 can send a notification to the base station 102 as part of the alarm. In addition, or alternatively, the processor 604 can send a notification to the authorized user. The security breach that is detected can be different from the movement beyond a threshold. For example, the security breach can include an event such as glass breakage, door opening, window opening, hit-and-run, or any other event detected by the sensors of the portable security device 600.

The portable security device 600 can further provide an audio/visual notification that can deter a theft of the item 130. For example, the audio speaker 614 and/or the light emitting device 618 can provide the audiovisual notification. The audiovisual notification can include an alarm sound, a flashing light pattern, or any other combination.

In addition, the portable security device 600 can be monitored using a base station 102 of the central security system 101. In such cases, the portable security device 600 can send a notification to the base station 102 that causes the base station 102 to sound an alarm as per one or more settings of the security system 101. In an embodiment, the notification to the base station 102 can be sent via a communication protocol such as BLUETOOTH, Z-WAVE, ZIGBEE, or any other such communication protocols that can be used for secure communication between security devices. Alternatively or in addition, the portable security device 600 can provide the notification to the base station 102 using the audio speakers 614 and/or the light emitting device 618. For example, the portable security device 600 can emit an audio or visual signal that is recognized by one or more sensors 104 of the central security system 101, that in turn, cause the base station 102 to sound the alarm. In an example, the audio/light signal(s) emitted by the portable security device 600 cannot be heard or seen by human eye.

Further, the communication can also be delivered to the authorized user listed in the database 250. The communication can be sent as a notification to a communication device, such as a phone, wearable, etc., using one or more communication protocols/techniques. For example, the communication can be sent using short messaging service (SMS), instant message, email, phone call, application-notification, or using any other communication technique.

The portable security device 600 facilitates ensuring that the item 139 is secured by the central security system 101 of a premise, such as a building where the item 130 is in the vicinity of the premise, as described herein.

For example, consider an example scenario where a user drives a vehicle to a restaurant. The user adds a portable security system associated with the vehicle to a central security system provided by the restaurant, parking garage, government, or any other parking facility provider. In one embodiment, the portable security system can be a security system that is inbuilt in the vehicle. Alternatively, the portable security system is a portable security device that is placed in the vehicle. The portable security device can belong to the user, the parking facility provider, or any other entity. The user can have the portable security device to transition into protect-mode until the user is at the restaurant (or any other store, office, etc.). Once the user has completed his/her visit, the user can have the portable security device transition back to sleep-mode, and use his/her vehicle. It should be noted that although a particular example scenario is described, other such application scenarios where one or more embodiments described herein are used to protect an item by dynamically expanding a central security system would be obvious to a person skilled in the art.

Embodiments of the technical solutions described herein provide a practical application to prevent a security-breach in areas that are typically left unattended by existing security systems by facilitating an expandable security system that can cascade multiple security systems together. Embodiments described herein facilitate a security system to be expanded so that the premises that are protected by the security system can be dynamically adjusted. For example, additional security systems can be added to a base station of security system that is assigned to protect a building. The additional security systems can be associated with one or more items/entities that are in the areas such as driveway, parking garage, yard, or other such typically unattended areas. The base station adds the security systems as sensors. A security-breach associated with the additional security systems is handled by the base station as a trigger to raise an alarm of its own. Accordingly, embodiments described herein provide a dynamic extension/expansion of security of a movable object, such as a vehicle, boat, package, etc.

Further, embodiments described herein facilitate a security system to monitor only a subset of the sensors that are dynamically added and/or removed from the security system. In comparison, in existing security systems, either all sensors of a security system are monitored or none.

It should be noted that during all of the operations described herein, the base station can facilitate a predetermined duration to pass before a transitioning an additional security system from one state to another. For example, when transitioning the additional security system from one mode (e.g., sleep-mode) to another (e.g., protect-mode), sounding an alarm, or any other such state transition, the base station waits for at least the predetermined duration before the state is updated. The base station may provide an indication of the transition, for example, via an audible or visual notification. The notification can be provided via the speakers 114, the lights 116, and/or the second security system 101B.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a garage security system, an identification associated with a vehicle;
   adding, by the garage security system, a vehicle security system of the vehicle to be monitored by the garage security system; and
   in response to an alarm from the vehicle security system, generating, by the garage security system, an alarm event of the garage security system.

2. The computer-implemented method of claim 1, further comprising:
   receiving, by the garage security system, a notification to configure the vehicle security system in protect-mode from an authorized user device; and
   in response, configuring, by the garage security system, the vehicle security system in the protect-mode, wherein the vehicle security system sounds an alarm in response to a sensor from the vehicle security system indicating a security-breach.

3. The computer-implemented method of claim 1, removing, by the garage security system, the vehicle security system from a list of security systems being monitored by the garage security system in response to receiving an instruction from an authorized user device.

4. The computer-implemented method of claim 3, wherein the garage security system receives the identification associated with the vehicle of which the vehicle security system is to be removed.

5. The computer-implemented method of claim 1, wherein the identification of the vehicle is received via a sensor coupled with the garage security system.

6. The computer-implemented method of claim 1, wherein the identification associated with the vehicle is received by entering a code associated with the vehicle security system via a sensor coupled with the garage security system.

7. The computer-implemented method of claim 1, further comprising, in response to receiving the identification of the vehicle security system, verifying, by the garage security system, that the identification is associated with an account associated with an authorized user.

8. The computer-implemented method of claim 1, wherein the identification associated with the vehicle is one of a parking pass, a parking entry card, a license tag of the vehicle, an RFID chip, and a mobile phone.

9. A security system comprising:
   a plurality of sensors; and
   a base station that is configured to monitor the plurality of sensors, and to perform a method to monitor a plurality of vehicle security systems, the method comprising:
      receiving an identification of a vehicle security system;
      adding the vehicle security system to a list of vehicle security systems to be monitored by the base station;
      configuring, by the base station, the vehicle security system in protect-mode, wherein the portable security system sounds an alarm in response to a sensor from the vehicle security system indicating a security-breach; and
      in response to the alarm from the vehicle security system, generating, by the base station, an alarm event of the security system.

10. The security system of claim 9, wherein the base station reconfigures the vehicle security system into sleep-mode in response to receiving an instruction from an authorized user.

11. The security system of claim 9, wherein the base station is further configured to remove the vehicle security system from the list in response to receiving an instruction from an authorized user.

12. The security system of claim 11, wherein the base station receives the identification of the vehicle security system to be removed.

13. The security system of claim 11, wherein the identification of the vehicle security system is received by the base station via a sensor of the security system.

14. The security system of claim 11, wherein the identification of the vehicle security system is received by entering a code associated with the vehicle security system.

15. The security system of claim 9, wherein the vehicle security system is integrated in the vehicle.

16. A portable security system comprising:
a sensor; and
a processor configured to perform a method to secure a vehicle by causing a central security system to monitor the vehicle, the method comprising:
  providing an identification to be used by a base station of the central security system to add the portable security system as a sensor of the central security system, the identification identifies the portable security system;
  receiving, in response, from the base station, a confirmation indicating that the portable security system has been added to a list of sensors of the central security system;
  generating an alarm in response to the sensor indicating a security-breach; and
  in response to the security-breach, sending, by the portable security system, a notification to the base station to generate an alarm event of the central security system.

17. The portable security system of claim 16, wherein the processor configures the portable security system into sleep-mode or protect-mode based on a received instruction.

18. The portable security system of claim 16, wherein the identification is sent via a sensor of the central security system.

19. The portable security system of claim 16, further comprising a machine-readable code that includes the identification.

20. The portable security system of claim 16, wherein the sensor is one from a group of motion detector, light sensor, door sensor, noise sensor, humidity sensor, heat sensor, camera, window sensor, glass-breakage sensor, and infrared sensor.

* * * * *